(12) United States Patent
Harrison et al.

(10) Patent No.: US 6,410,491 B1
(45) Date of Patent: Jun. 25, 2002

(54) POLYALKENYL SULFONATES

(75) Inventors: James J. Harrison, Novato; Curtis B. Campbell, Hercules, both of CA (US)

(73) Assignee: Chevron Chemical Company LLC, San Ramon, CA (US)

(*) Notice: Subject to any disclaimer, the term of this patent is extended or adjusted under 35 U.S.C. 154(b) by 0 days.

(21) Appl. No.: 09/527,166

(22) Filed: Mar. 17, 2000

(51) Int. Cl.$^7$ .................. C10M 159/24; C10M 151/00
(52) U.S. Cl. ......................... 508/391; 508/390
(58) Field of Search ................ 508/390, 391

(56) References Cited

U.S. PATENT DOCUMENTS

| | | | | |
|---|---|---|---|---|
| 3,496,105 A | * | 2/1970 | LeSuer ................. 252/33.6 |
| 4,105,647 A | * | 8/1978 | O'Farrell et al. ............ 526/33 |
| 4,157,432 A | * | 6/1979 | Lundberg et al. ............ 526/31 |
| 4,159,956 A | | 7/1979 | de Vries .................. 253/33.4 |
| 4,159,957 A | | 7/1979 | de Vries .................. 253/33.4 |
| 4,159,958 A | | 7/1979 | de Vries .................. 252/33.4 |
| 4,159,959 A | | 7/1979 | de Vries .................. 252/33.4 |
| 4,361,658 A | * | 11/1982 | Lundberg et al. ........... 523/132 |
| 4,778,614 A | * | 10/1988 | Rawlinson et al. ......... 252/49.5 |
| 5,328,960 A | | 7/1994 | Loveless ................... 525/203 |
| 5,389,271 A | * | 2/1995 | Lundberg et al. ............. 252/33 |
| 5,408,018 A | * | 4/1995 | Rath ........................ 526/237 |
| 5,448,000 A | | 9/1995 | Gullapalli ................... 526/85 |
| 5,804,094 A | | 9/1998 | Alcock et al. ................ 252/18 |
| 5,922,655 A | * | 7/1999 | Moulin et al. ............... 508/390 |
| 5,929,003 A | * | 7/1999 | DeMontlaur ................ 508/390 |

* cited by examiner

Primary Examiner—Ellen M. McAvoy
(74) Attorney, Agent, or Firm—Richard J. Sheridan; Linda A. Stokley

(57) ABSTRACT

Provided is a polyalkenyl sulfonic acid composition comprising a mixture of polyalkenyl sulfonic acids derived from a mixture of polyalkenes comprising greater than 20 mole percent alkyl vinylidene and 1,1-dialkyl isomers, and a method for making the composition. Also provided are low and high overbased sulfonates made from the mixture of polyalkenyl sulfonic acids, and lubricating oils containing the sulfonates.

86 Claims, 2 Drawing Sheets

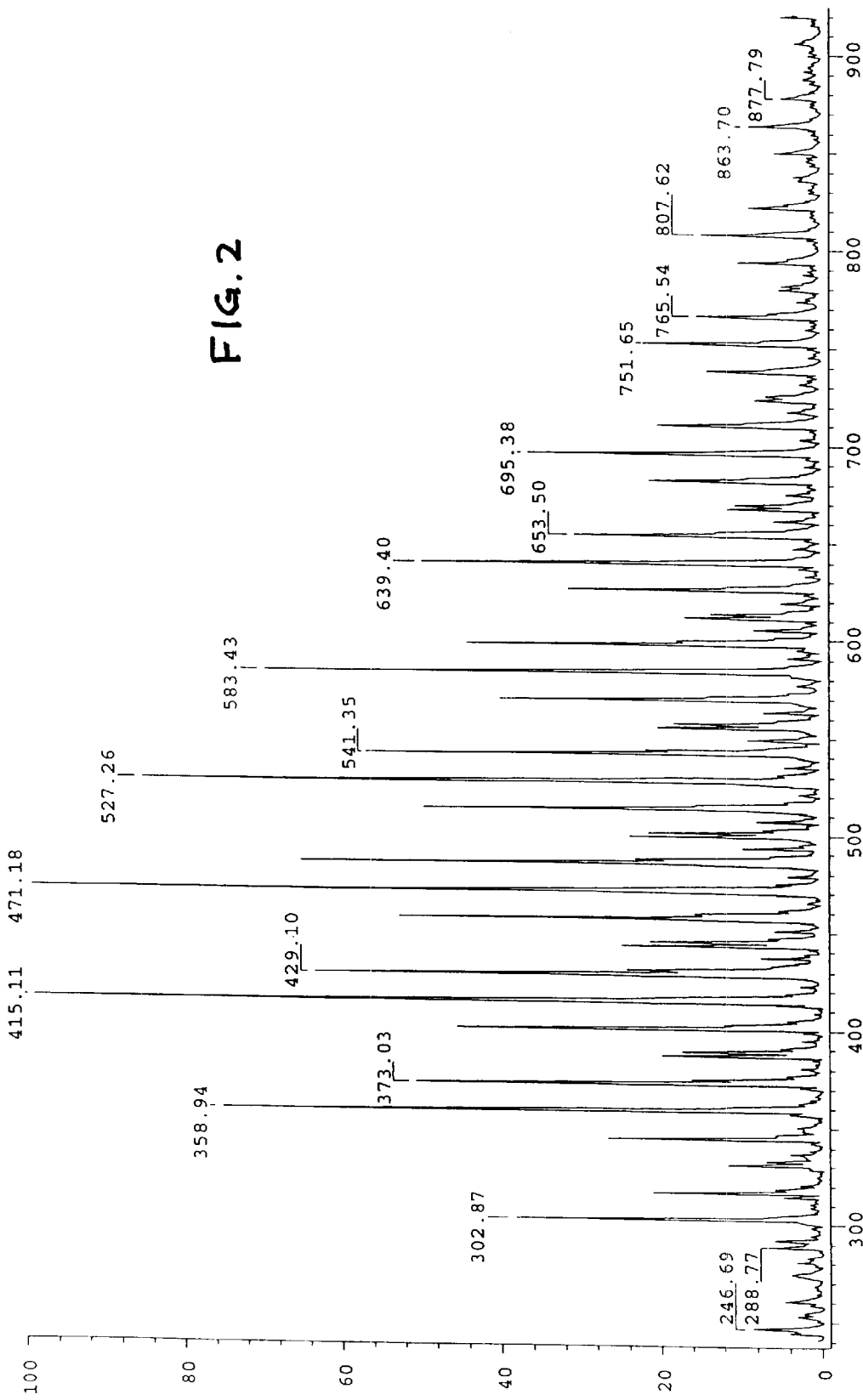

POLYALKENYL SULFONATES

BACKGROUND OF THE INVENTION

Sulfonates are a class of chemicals used in household, industrial, and institutional cleaning applications, personal care and agricultural products, metalworking fluids, industrial processes, emulsifying agents, corrosion inhibitors and as additives in lubricating oils. Some of the desirable properties of sulfonates for use in lubricating oil applications include their low cost, compatibility, water tolerance, corrosion inhibition, emulsion performance, friction properties, high temperature stability, rust performance, and light color.

Sulfonates that are used in lubricating oil applications have been classified as either neutral sulfonates, low overbased (LOB) sulfonates, or high overbased (HOB) sulfonates.

In the past, natural sulfonates, made as a by-product of white oil and process oil production, dominated the sulfonate market. However, as refineries switched to hydrotreating processes, which gave improved yields of process oils and white oils, and as the desire for higher utilization of raw materials and thus improved economics grew, synthetic sulfonates have become more readily available. Many synthetic sulfonates have been produced from sulfonated polyalkyl aromatic compounds. Unfortunately, many synthetic sulfonates provide properties that are inferior to the properties of the natural sulfonates. Thus, there is a need for low cost synthetic sulfonates that have good performance properties and can serve as a replacement for the natural sulfonates.

SUMMARY OF THE INVENTION

The present invention provides a polyalkenyl sulfonic acid composition comprising a mixture of polyalkenyl sulfonic acids derived from a mixture of polyalkenes comprising greater than 20 mole percent alkyl vinylidene and 1,1-dialkyl isomers. The present invention also provides such a composition wherein the alkyl vinylidene isomer is a methyl vinylidene isomer, and the 1,1-dialkyl isomer is a 1,1-dimethyl isomer. Also provided is such a composition wherein the number average molecular weight of the polyalkene is about 168 to about 5000. In a preferred embodiment, the polyalkene is polyisobutene. In another preferred embodiment, the polyalkene is polyisobutene and the molecular weight distribution of the polyisobutenyl sulfonic acids has at least 80% of the polyisobutenyl sulfonic acids molecular weights separated by even multiples of 56 daltons. The present invention further provides such a composition wherein the polyalkene is polyisobutene and less than 20% of the polyisobutenyl sulfonic acids in the molecular weight distribution of the polyisobutenyl sulfonic acids contain a total number of carbon atoms that is not evenly divisible by four.

Also provided by the present invention is an improved method of making polyalkenyl sulfonic acid by sulfonating polyalkenes, wherein the improvement comprises using as the polyalkenes a mixture of polyalkenes comprising greater than 20 mole percent alkyl vinylidene and 1,1-dialkyl isomers. The present invention further provides the product of this process.

The present invention further provides a polyalkenyl sulfonate composition having a TBN of about 0 to about 60 wherein the polyalkenyl sulfonate is an alkali metal or alkaline earth metal salt of a polyalkenyl sulfonic acid derived from a mixture of polyalkenes comprising greater than 20 mole percent alkyl vinylidene and 1,1-dialkyl isomers. Further provided in accordance with this invention is a polyalkenyl sulfonate composition having a TBN of greater than 60 to about 400 wherein the polyalkenyl sulfonate is an alkali metal or alkaline earth metal salt of a polyalkenyl sulfonic acid derived from a mixture of polyalkenes comprising greater than 20 mole percent alkyl vinylidene and 1,1-dialkyl isomers.

In accordance with the present invention there is also provided an improved method of making polyalkenyl sulfonate by sulfonating polyalkenes and reacting the resulting polyalkenyl sulfonic acid with an alkali metal or alkaline earth metal, the improvement comprising using as the polyalkenes a mixture of polyalkenes comprising greater than 20 mole percent alkyl vinylidene and 1,1-dialkyl isomers. The present invention also provides the product produced by this process.

Also provided by the present invention is a lubricating oil composition comprising a major amount of an oil of lubricating viscosity and a minor amount of a polyalkenyl sulfonate composition having a TBN of about 0 to about 60 wherein the polyalkenyl sulfonate is an alkali metal or alkaline earth metal salt of a polyalkenyl sulfonic acid derived from a mixture of polyalkenes comprising greater than 20 mole percent alkyl vinylidene and 1,1-dialkyl isomers. The present invention also provides a lubricating oil composition comprising a major amount of an oil of lubricating viscosity and a minor amount of a polyalkenyl sulfonate composition having a TBN of greater than 60 to about 400 wherein the polyalkenyl sulfonate is an alkali metal or alkaline earth metal salt of a polyalkenyl sulfonic acid derived from a mixture of polyalkenes comprising greater than 20 mole percent alkyl vinylidene and 1,1-dialkyl isomers.

BRIEF DESCRIPTION OF THE DRAWINGS

FIG. 2 is a negative ion electrospray ionization mass spectrum of a polybutene sulfonic acid made from a polybutene with less than 10% methylvinylidene isomer content, i.e., not a polybutenyl sulfonic acid of this invention.

DETAILED DESCRIPTION OF THE INVENTION

Figure 1:
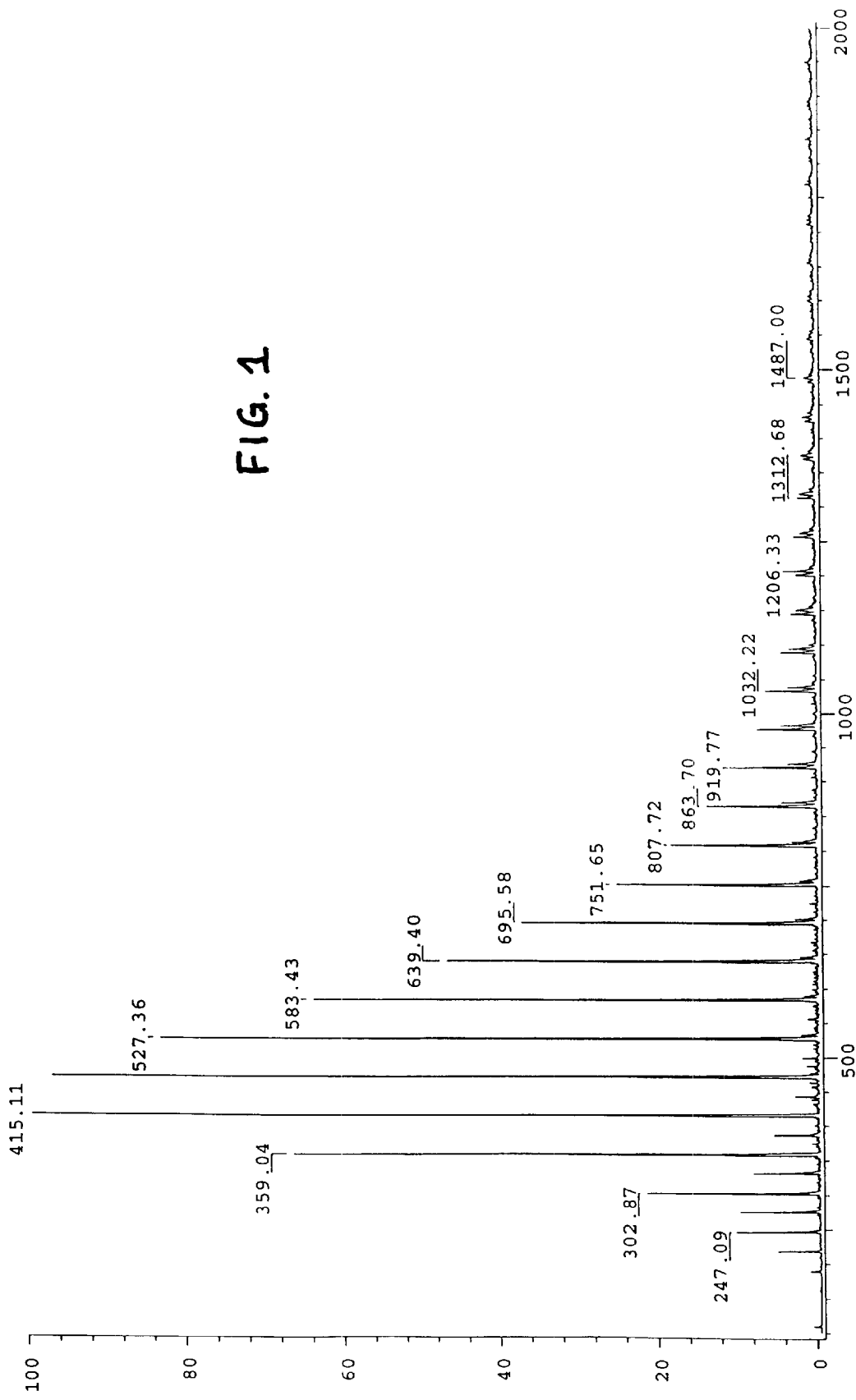
FIG. 1 is a negative ion electrospray ionization mass spectrum of a polybutene sulfonic acid of a polybutenyl sulfonic acid made in accordance with the present invention.

The polyalkenyl sulfonic acids of this invention are prepared by reacting a mixture of polyalkenes comprising greater than 20 mole percent alkyl vinylidene and 1,1-dialkyl isomers with a source of sulfur trioxide —$SO_3$—. The source of —$SO_3$— can be a mixture of sulfur trioxide and air, sulfur trioxide hydrates, sulfur trioxide amine complexes, sulfur trioxide ether complexes, sulfur trioxide phosphate complexes, acetyl sulfate, a mixture of sulfur trioxide and acetic acid, sulfamic acid, alkyl sulfates or chlorosulfonic acid. The reaction may be conducted neat or in any inert anhydrous solvent. The conditions for sulfonation are not critical. Reaction temperatures can range from −30° C. to 200° C. and depends on the particular sulfonating agent employed. For example, acetyl sulfate requires low temperatures for reaction and elevated temperatures should be avoided to prevent decomposition of the product. Reaction time can vary from a few minutes to several hours depending on other conditions, such as reaction temperature. The extent of the reaction can be determined by titration of sulfonated polyalkene after any free sulfuric acid has been washed out. Typical mole ratios of sulfonating agent to polyalkene can be about 1:1 to 2:1.

The preferred sulfonating agent is acetyl sulfate (or a mixture of sulfuric acid and acetic anhydride which forms acetyl sulfate in situ) which produces the polyalkenyl sulfonic acid directly. Other sulfonating agents, such as a mixture of sulfur trioxide and air, may produce a sultone intermediate that needs to be hydrolyzed to the sulfonic acid. This hydrolysis step can be very slow.

The polyalkenes used to prepare the polyalkenyl sulfonic acid are a mixture of polyalkenes having 12 to 350 carbon atoms. The mixture comprises greater than 20 mole percent, preferably greater than 50 mole percent, and more preferably greater than 70 mole percent alkylvinylidene and 1,1-dialkyl isomers. The preferred alkylvinylidene isomer is a methyl vinylidene isomer, and the preferred 1,1-dialkyl isomer is a 1,1-dimethyl isomer.

The polyalkenes have a number average molecular weight in the range of about 168 to about 5000. Polyalkenes having number average molecular weights of about 550, 1000 or 2300 are particularly useful.

The preferred polyalkene is polyisobutene. Especially preferred are polyisobutenes made using $BF_3$ as catalyst.

U.S. Pat. No. 5,408,018, which issued on Apr. 18, 1995 to Rath and which is incorporated by reference in its entirety, and the references cited therein describe a suitable process for the production of polyisobutenes that contain greater than 20 mole percent alkylvinylidene and 1,1-dialkyl isomers.

Typically, when polyisobutenyl sulfonic acids or sulfonates are prepared from polyisobutene having a low mole percent of alkylvinylidene and 1,1-dialkyl isomers, the product has a molecular weight distribution similar to that shown in FIG. 2. Since polyisobutene is used to prepare the sulfonic acid or sulfonate, it should be expected that the mass spectrum of the product would show compounds separated by even multiples of 56 daltons, i.e., a $C_4H_8$ fragment. However, FIG. 2, which is the mass spectrum of a polyisobutenyl sulfonate prepared from a polyisobutene having a mole percent of methylvinylidene isomers of less than 20%, clearly shows compounds which are separated by less than 56 daltons.

It has now been discovered that when polyisobutene having a mole percent of alkyl vinylidene and 1,1-dialkyl isomers greater than 20% is used to prepare polyisobutenyl sulfonic acids or sulfonates, the molecular weight distribution of the resulting product has at least 80% of the polyisobutenyl sulfonic acids or sulfonates whose molecular weights are separated by even multiples of 56 daltons (see FIG. 1). In other words, less than 20% of the polyisobutenyl sulfonic acids or sulfonates in the molecular weight distribution of the sulfonic acids or sulfonates contain a total number of carbon atoms that is not evenly divisible by four.

The polyalkenyl sulfonates of this invention are prepared by reacting the polyalkenyl sulfonic acid (prepared as described above) with a source of an alkali or alkaline earth metal. The alkali or alkaline earth metal can be introduced into the sulfonate by any suitable means. One method comprises combining a basically reacting compound of the metal, such as the hydroxide, with the polyalkenyl sulfonic acid. This is generally carried out in the presence of a hydroxylic promoter such as water, alcohols such as 2-ethyl hexanol, methanol or ethylene glycol, and an inert solvent for the sulfonate, typically with heating. Under these conditions, the basically reacting compound will yield the metal sulfonate. The hydroxylic promoter and solvent can then be removed to yield the metal sulfonate.

Under certain circumstances, it may be more convenient to prepare an alkali metal polyalkenyl sulfonate and convert this material by metathesis into an alkaline earth metal sulfonate. Using this method, the sulfonic acid is combined with a basic alkali metal compound such as sodium or potassium hydroxide. The sodium or potassium sulfonate obtained can be purified by aqueous extraction. Then, the sodium or potassium sulfonate is combined with an alkaline earth metal salt to form the alkaline earth metal sulfonate. The most commonly used alkaline earth metal compound is a halide, particularly a chloride. Typically, the sodium or potassium sulfonate is combined with an aqueous chloride solution of the alkaline earth metal and stirred for a time sufficient for metathesis to occur. Thereafter, the water phase is removed and the solvent may be evaporated, if desired.

The preferred sulfonates are alkaline earth metal sulfonates, especially those of calcium, barium and magnesium. Most preferred are the calcium and magnesium sulfonates.

The polyalkenyl sulfonates of this invention are either neutral or overbased sulfonates. Overbased materials are characterized by a metal content in excess of that which would be present according to the stoichiometry of the metal cation in the sulfonate said to be overbased. Thus, a monosulfonic acid when neutralized with an alkaline earth metal compound, such as a calcium compound, will produce a normal sulfonate containing one equivalent of calcium for each equivalent of acid. In other words, the normal metal sulfonate will contain one mole of calcium for each two moles of the monosulfonic acid.

By using well known procedures, overbased or basic complexes of the sulfonic acid can be obtained. These overbased materials contain amounts of metal in excess of that required to neutralize the sulfonic acid. Highly overbased sulfonates can be prepared by the reaction of overbased sulfonates with carbon dioxide under reaction conditions. A discussion of the general methods for preparing overbased sulfonates and other overbased products is disclosed in U.S. Pat. No. 3,496,105, issued Feb. 17, 1970 to LeSuer, which in incorporated by reference in its entirety.

The amount of overbasing can be expressed as a Total Base Number ("TBN"), which refers to the amount of base equivalent to one milligram of KOH in one gram of sulfonate. Thus, higher TBN numbers reflect more alkaline products and therefor a greater alkalinity reserve. The TBN for a composition is readily determined by ASTM test method D664 or other equivalent methods. The overbased polyalkenyl sulfonates of this invention can have relatively low TBN, i.e., about 0 to about 60, or relatively high TBN, i.e., greater than 60 to about 400.

The polyalkenyl sulfonates of this invention are useful as additives in lubricating oils. They have good tolerance to water, a light color and provide good performance characteristics.

The lubricating oil compositions of this invention comprise a major amount of an oil of lubricating viscosity and a minor amount of the polyalkenyl sulfonates of this invention. The oils can be derived from petroleum or be synthetic. The oils can be paraffinic, naphthenic, halosubstituted hydrocarbons, synthetic esters, or combinations thereof. Oils of lubricating viscosity have viscosities in the range from 35 to 55,000 SUS at 100° F., and more usually from about 50 to 10,000 SUS at 100° F. The lubricating oil compositions contain an amount of the polyalkenyl sulfonates of this invention sufficient to provide dispersant properties, typically from about 0.1 weight percent to 10 weight percent, preferably from about 0.5 weight percent to about 7 weight percent.

Other conventional additives that can be used in combination with the polyalkenyl sulfonates of this invention include oxidation inhibitors, antifoam agents, viscosity index improvers, pour point depressants, dispersants and the like.

The lubricating oil compositions of this invention are useful for lubricating internal combustion engines and automatic transmissions, and as industrial oils such as hydraulic oils, heat transfer oils, torque fluids, etc.

EXAMPLE 1

Preparation of a Polyisobutene Sulfonic Acid from a High Methylvinylidene Polyisobutene that has a $M_n$ of 550 and Acetyl Sulfate To a beaker is added 5.5 g (0.01 mol) of Glissopal 550 polyisobutene (which has greater than about 80% methylvinylidene content with a number average molecular weight of about 550) dissolved in 20 mL hexane. To this is added 1.63 g acetic anhydride (0.016 mole) and then 0.98 g sulfuric acid (0.01 mole). The resulting mixture is stirred at room temperature for one hour. Then some methanol is added to quench the reaction and the solvents are removed in vacuo. A total of 7.16 g of crude polyisobutene sulfonic acid is obtained.

EXAMPLE 2

Preparation of a Lob Polyisobutene Sodium Sulfonate from the Product of Example 1

To 5.91 g of the sulfonic acid from Example 1 is added 20 mL isopropyl alcohol and 1 g sodium hydroxide in 1 mL of water. The resulting mixture is refluxed for 6 hours and then held at room at room temperature overnight. Two layers form and the bottom layer is decanted. The top layer contains sodium polyisobutene sulfonate (5.67 g) which contains 88% actives. The lower layer is stripped in vacuo and contains 1.14 g of a mixture of sodium hydroxide and sodium polyisobutene sulfonate.

EXAMPLE 3

Preparation of Calcium Lob Polyisobutene Sulfonate

To a 2L round bottom flask is added 500 g of Glissopal 550 polyisobutene (0.91 mol), 140.3 g acetic anhydride (1.38 mol), and 84.7 g concentrated sulfuric acid (0.86 mol) at room temperature. The resulting mixture is stirred 4 hours at room temperature. Then to this mixture is added 50 mL methanol to quench the reaction, and 500 g of 100 neutral diluent oil. To this is then added 32.0 g calcium hydroxide (0.43 mol) and 20 mL water. The resulting mixture is heated to 175° F. and then 100 mL water is added. This is then heated to 225–230° F. for 30 minutes, and then heated at 330° F. for 1 hour to strip off the water. A calcium polyisobutene sulfonate is obtained.

EXAMPLE 4

Preparation of Polyisobutene Sulfonic Acid Using $SO_3$ and Air

A thin film of Glissopal 550 polyisobutene is sulfonated using $SO_3$ and air under the following conditions: temperature 60° C., $SO_3$ flow 16L/hr, air flow 192L/hr, feed rate 4.5 g/min. The product from this reaction is a mixture of polyisobutene sulfonic acid and polyisobutene sultone. The product contains 2.04% sulfonate as calcium sulfonate and 0.70% sulfuric acid as determined by hyamine titration.

EXAMPLE 5

Preparation of Polyisobutene Sulfonic Acid Using $SO_3$ and Air

A thin film of Glissopal 550 polyisobutene is sulfonated using $SO_3$ and air under the following conditions: temperature 60° C., $SO_3$ flow 16L/hr, air flow 192L/hr, feed rate 4.2 g/min. A total of 1354 g product is obtained which is a mixture of polyisobutene sulfonic acid and polyisobutene sultone. The product contains 2.5% sulfonate as calcium sulfonate and 1.02% sulfuric acid as determined by hyamine titration. The acid number is determined by the ASTM D664 test to be 59.9 mg KOH/g sample.

EXAMPLE 6

Preparation of Sodium Polyisobutene Sulfonate

The mixture of polyisobutene sulfonic acid and polyisobutene sultone from Example 5 is hydrolyzed using the following procedure. To a 100 mL three neck flask equipped with a reflux condenser and stirrer is added 20 g of polyisobutene sulfonic acid and the resulting mixture is heated to 100° C. To this is added 5 mL 49% sodium hydroxide solution and the resulting mixture is stirred for four hours. The product from this reaction is a mixture of sodium polyisobutene sulfonate and polyisobutene sultone.

EXAMPLE 7

Preparation of Calcium Polyisobutene Sulfonate from 550 MW Polyisobutene (Neutral Sulfonate To a 2 L round bottom flask is added 500 g (0.91 mol) Glissopal 550 (550 $M_n$ polyisobutene containing about 85% methylvinylidene isomer), 140.3 g acetic anhydride, (1.38 mol; 1.5 equivalents), and 84.7 g sulfuric acid (0.864 mol; 0.95 equivalents) dropwise at room temperature. The resulting mixture is stirred 4 hours at room temperature. Then to this is added 50 mL methanol and then 500 g 100 neutral diluent oil is added. To this is then added 32.0 g calcium hydroxide (0.43 mol) and 20 mL water. This is heated to about 80° C. and an additional 100 mL or water is added. Then the volatile materials are removed at elevated temperatures. The product is filtered to give 842.3 g of product which has a TBN of 3.4 mg KOH/g sample, a viscosity @100° C. of 72.4 cSt, 1.50% Ca, and 2.31% S.

EXAMPLE 8

Preparation of Calcium Polyisobutene Sulfonate from 550 MW Polyisobutene (Lob Sulfonate)

To a 4 L beaker is added 500 g (0.91 mol) Glissopal 550 polyisobutene (550 $M_n$ polyisobutene with about 85% methylvinylidene isomer content), 140.3 g acetic anhydride (1.38 mol), and 84.7 g sulfuric acid (0.864 mol). The resulting mixture is stirred 1 hour at room temperature. To this is then added 50 mL methanol, 500 g 100 neutral diluent oil, and 100 mL water. The resulting mixture is heated to 190° F. and 48 g (0.649 mol) calcium hydroxide is added. This is stirred for one hour and then the temperature is raised to 212° F. and maintained there until all the volatile material has distilled. The resulting product is then filtered to give a LOB calcium polyisobutene sulfonate which has a TBN of 12.3 mg KOH/g sample, 2.24% S, 1.85% Ca, and a viscosity @100° C. of 79.4 cSt.

EXAMPLE 9

Preparation of Additional Polyisobutene Sulfonates

Additional examples of calcium polyisobutene sulfonates are carried out using different conditions, charge mole ratios ("CMR's") and polyisobutene ("PIB") molecular weights as shown in Table 1.

| Ex. | PIB $M_n$ | % diluent oil | $Ac_2O$/ PIB | $H_2SO_4$/ PIB | $H_2SO_4$/ $Ca(OH)_2$ | % Ca | % S | TBN | Vis @ 100° C. |
|---|---|---|---|---|---|---|---|---|---|
| 7 | 550 | 50 | 1.52 | 0.95 | 2.01 | 1.50 | 2.31 | 3.4 | 72.4 |
| 8 | 550 | 50 | 1.52 | 0.95 | 1.33 | 1.85 | 2.24 | 12.0 | 79.4 |
| 9 | 550 | 45 | 1.51 | 0.95 | 1.83 | 1.84 | 2.60 | 5.5 | 113.8 |
| 10 | 550 | 45 | 1.51 | 0.95 | 2.00 | 1.71 | 2.58 | 2.6 | 167.4 |
| 11 | 1000 | 45 | 1.51 | 0.95 | 1.81 | 1.08 | 1.50 | 3.1 | 153.8 |
| 12 | 1000 | 45 | 1.51 | 0.95 | 1.76 | 1.03 | 1.52 | 0.9 | 156.1 |
| 13 | 1000 | 45 | 1.50 | 0.95 | 1.83 | 1.08 | 1.49 | 3.9 | 163.8 |

EXAMPLE 14

Preparation of Calcium Acetate-Free 550 $M_n$ Calcium Polyisobutene Sulfonate The sulfonic acid from 550 $M_n$ polyisobutene is first prepared by reacting Glissopal 550 polyisobutene (2000 g, 3.64 mol), with 408.3 g acetic anhydride (4.0 mol), and 338.7 g sulfuric acid (3.46 mol). The resulting mixture is stirred for one hour at room temperature. Then 200 mL of methanol is added. The resulting product contains about 90% actives. Then 260 g of this product is diluted with 260 g of 100 neutral diluent oil and this is heated at 40° C. with a nitrogen sparge to remove the unreacted acetic acid, methyl acetate, and methanol. Analysis by $^1$H NMR spectroscopy indicates that only about 0.3% acetic acid remained. This product (448.2 g) is then placed in a 1000 mL beaker and heated to 190° F. and to this is added 13.2 g calcium hydroxide. The resulting mixture is stirred for 1 hour at 190° F., and then the temperature is increased to 330° F. to remove any volatile material. The resulting product is then filtered to give a calcium acetate-free calcium polyisobutene sulfonate which has a TBN of 5.4 mg KOH/g sample, 1.12% Ca, 1.82% S, and a viscosity @100° C. of 27.5 cSt.

COMPARATIVE EXAMPLE A

Preparation of 950 $M_n$ Polyisobutene Sulfonic Acid from Parapol 1000

200 g Parapol 950 (950 $M_n$ polyisobutene with less than 5% methylvinylidene isomer content, 0.21 mol) is reacted with 22.46 g acetic anhydride (0.22 mol) and 18.63 g sulfuric acid (0.190 mol). The resulting product is stirred at room temperature for 1 hour then 20 mL methanol was added. This product contains only about 67% actives.

EXAMPLE 15

Preparation of 1000 $M_n$ Polyisobutene Sulfonic Acid from Glissopal 1000

To 2000 g (2.0 mol) of Glissopal 1000 polyisobutene ($M_n$ 1000 with about 85% methylvinylidene isomer content) is added 224.6 g acetic anhydride (2.2 mol) and 186.3 g of sulfuric acid (1.90 mol). The resulting product is reacted as in Comparative Example A. The product contains about 90% actives. This shows the improvement in yield that is obtained with the teachings of this invention.

COMPARATIVE EXAMPLE B

Electrospray Ionization-Mass Spectrum of Sulfonic Acid from Polyisobutene whit Less than 20% Methylvinilidene Content FIG. 2 shows the electrospray ionization mass spectrum of a polybutene sulfonic acid from Hivis 5 (polybutene with less than 10% methylvinylidene isomer content). The spectrum shows a molecular weight distribution with molecular ions that are separated by 14 daltons. This indicates that the polyisobutene sulfonic acid actually is not a mixture of $C_{12}$, $C_{16}$, $C_{20}$ etc. isomers, but is a mixture of $C_{,12}$, $C_{13}$, $C_{14}$, etc., isomers.

EXAMPLE 16

Electrospray Ionization-Mass Spectrum of Sulfonic Acid from Polyisobutene with More than 20% Methylvinylidene Content FIG. 1 shows the electrospray ionization mass spectrum of a polybutene sulfonic acid from Glissopal 550 (polybutene with greater than 85% methylvinylidene isomer content). The spectrum shows a molecular weight distribution with molecular ions that are separated by 56 daltons. This indicates that the polyisobutene sulfonic acid is a mixture of $C_{12}$, $C_{16}$, $C_{20}$, etc., isomers (i.e., the ions are multiples of four carbon atoms).

What is claimed is:

1. A polyisobutenyl sulfonic acid composition derived only from polyisobutene comprising greater than 20 mole percent alkyl vinylidene and 1,1-dialkyl isomers.

2. The composition of claim 1 wherein the polyisobutene comprises greater than 50 mole percent alkyl vinylidene and 1,1-dialkyl isomers.

3. The composition of claim 1 wherein the polyisobutene comprises greater than 70 mole percent alkyl vinylidene and 1,1-dialkyl isomers.

4. The composition of claim 1, 2 or 3 wherein the alkyl vinylidene isomer is a methyl vinylidene isomer, and the 1,1-dialkyl isomer is a 1,1-dimethyl isomer.

5. The composition of claim 1 wherein the number average molecular weight of the polyisobutene is about 168 to about 5000.

6. The composition of claim 1 wherein the number average molecular weight of the polyisobutene is about 550.

7. The composition of claim 1 wherein the number average molecular weight of the polyisobutene is about 1000.

8. The composition of claim 1 wherein the number average molecular weight of the polyisobutene is about 2300.

9. The composition of claim 1 wherein the molecular weight distribution of the polyisobutenyl sulfonic acids has at least 80% of the polyisobutenyl sulfonic acids molecular weights separated by even multiples of 56 daltons.

10. The composition of claim 1 wherein less than 20% of the polyisobutenyl sulfonic acids in the molecular weight distribution of the polyisobutenyl sulfonic acids contain a total number of carbon atoms that is not evenly divisible by four.

11. In a method of making polyisobutene sulfonic acid by sulfonating polyisobutene, the improvement comprising using as the polyisobutene, a mixture of polyisobutenes comprising greater than 20 mole percent alkyl vinylidene and 1,1-dialkyl isomers.

12. The method of claim 11 wherein the mixture of polyisobutene comprises greater than 50 mole percent alkyl vinylidene and 1,1-dialkyl isomers.

13. The method of claim 11 wherein the mixture of polyisobutene comprises greater than 70 mole percent alkyl vinylidene and 1,1-dialkyl isomers.

14. The method of claim 11, 12 or 13 wherein the alkyl vinylidene isomer is a methyl vinylidene isomer, and the 1,1-dialkyl isomer is a 1,1-dimethyl isomer.

15. The method of claim 11 wherein the number average molecular weight of the polyisobutene is about 168 to about 5000.

16. The method of claim 11 wherein the number average molecular weight of the polyisobutene is about 550.

17. The method of claim 11 wherein the number average molecular weight of the polyisobutene is about 1000.

18. The method of claim 11 wherein the number average molecular weight of the polyisobutene is about 2300.

19. The method of claim 11 wherein the polyisobutene is made using a $BF_3$ catalyst.

20. The method of claim 11 wherein less than 20% of the polyisobutenyl sulfonic acids in the molecular weight distribution of the polyisobutenyl sulfonic acids contain a total number of carbon atoms that is not evenly divisible by four.

21. The product produced by the method of claims 11, 12, 13, 15, 16, 17, 18, 19, or 20.

22. The product produced by the method of claim 14.

23. An overbased polyalkenyl sulfonate composition wherein the polyalkenyl sulfonate is an alkali metal or alkaline earth metal salt of a polyalkenyl sulfonic acid derived from a mixture of polyalkenes comprising greater than 20 mole percent alkyl vinylidene and 1,1-dialkyl isomers.

24. The composition of claim 23 wherein the mixture of polyalkenes comprises greater than 50 mole percent alkyl vinylidene and 1,1-dialkyl isomers.

25. The composition of claim 23 wherein the mixture of polyalkenes comprises greater than 70 mole percent alkyl vinylidene and 1,1-dialkyl isomers.

26. The composition of claim 23, 24 or 25 wherein the alkyl vinylidene isomer is a methyl vinylidene isomer, and the 1,1-dialkyl isomer is a 1,1-dimethyl isomer.

27. The composition of claim 23 wherein the number average molecular weight of the polyalkene is about 168 to about 5000.

28. The composition of claim 23 wherein the number average molecular weight of the polyalkene is about 550.

29. The composition of claim 23 wherein the number average molecular weight of the polyalkene is about 1000.

30. The composition of claim 23 wherein the number average molecular weight of the polyalkene is about 2300.

31. The composition of claim 23 wherein the polyalkene is polyisobutene.

32. The composition of claim 31 wherein the polyisobutene is made using a $BF_3$ catalyst.

33. The composition of claim 23 wherein the polyalkene is polyisobutene and the molecular weight distribution of the polyisobutenyl sulfonic acids has at least 80% of the polyisobutenyl sulfonic acids molecular weights separated by even multiples of 56 daltons.

34. The composition of claim 23 wherein the polyalkene is polyisobutene and less than 20% of the polyisobutenyl sulfonic acids in the molecular weight distribution of the polyisobutenyl sulfonic acids contain a total number of carbon atoms that is not evenly divisible by four.

35. A polyalkenyl sulfonate composition having a TBN of greater than 60 to about 400 wherein the polyalkenyl sulfonate is an alkali metal or alkaline earth metal salt of a polyalkenyl sulfonic acid derived from a mixture of polyalkenes comprising greater than 20 mole percent alkyl vinylidene and 1,1-dialkyl isomers.

36. The composition of claim 35 wherein the mixture of polyalkenes comprises greater than 50 mole percent alkyl vinylidene and 1,1-dialkyl isomers.

37. The composition of claim 35 wherein the mixture of polyalkenes comprises greater than 70 mole percent alkyl vinylidene and 1,1-dialkyl isomers.

38. The composition of claim 35, 36 or 37 wherein the alkyl vinylidene isomer is a methyl vinylidene isomer, and the 1,1-dialkyl isomer is a 1,1-dimethyl isomer.

39. The composition of claim 35 wherein the number average molecular weight of the polyalkene is about 168 to about 5000.

40. The composition of claim 35 wherein the number average molecular weight of the polyalkene is about 550.

41. The composition of claim 35 wherein the number average molecular weight of the polyalkene is about 1000.

42. The composition of claim 35 wherein the number average molecular weight of the polyalkene is about 2300.

43. The composition of claim 35 wherein the polyalkene is polyisobutene.

44. The composition of claim 43 wherein the polyisobutene is made using a $BF_3$ catalyst.

45. The composition of claim 35 wherein the polyalkene is polyisobutene and the molecular weight distribution of the polyisobutenyl sulfonic acids has at least 80% of the polyisobutenyl sulfonic acids molecular weights separated by even multiples of 56 daltons.

46. The composition of claim 35 wherein the polyalkene is polyisobutene and less than 20% of the polyisobutenyl sulfonic acids in the molecular weight distribution of the polyisobutenyl sulfonic acids contain a total number of carbon atoms that is not evenly divisible by four.

47. A method of making an overbased polyalkenyl sulfonate by sulfonating polyalkenes and reacting the resulting polyalkenyl sulfonic acid with an alkali metal or alkaline earth metal, the improvement comprising using as the polyalkenes a mixture of polyalkenes comprising greater than 20 mole percent alkyl vinylidene and 1,1-dialkyl isomers.

48. The method of claim 47 wherein the mixture of polyalkenes comprises greater than 50 mole percent alkyl vinylidene and 1,1-dialkyl isomers.

49. The method of claim 47 wherein the mixture of polyalkenes comprises greater than 70 mole percent alkyl vinylidene and 1,1-dialkyl isomers.

50. The method of claim 47, 48 or 49 wherein the alkyl vinylidene isomer is a methyl vinylidene isomer, and the 1,1-dialkyl isomer is a 1,1-dimethyl isomer.

51. The method of claim 47 wherein the number average molecular weight of the polyalkene is about 168 to about 5000.

52. The method of claim 47 wherein the number average molecular weight of the polyalkene is about 550.

53. The method of claim 47 wherein the number average molecular weight of the polyalkene is about 1000.

54. The method of claim 47 wherein the number average molecular weight of the polyalkene is about 2300.

55. The method of claim 47 wherein the polyalkene is polyisobutene.

56. The method of claim 55 wherein the polyisobutene is made using a $BF_3$ catalyst.

57. The method of claim 47 wherein the polyalkene is polyisobutene and the molecular weight distribution of the polyisobutenyl sulfonic acids has at least 80% of the polyisobutenyl sulfonic acids molecular weights separated by even multiples of 56 daltons.

58. The method of claim 47 wherein the polyalkene is polyisobutene and less than 20% of the polyisobutenyl sulfonic acids in the molecular weight distribution of the polyisobutenyl sulfonic acids contain a total number of carbon atoms that is not evenly divisible by four.

59. The product produced by the method of claim 47, 48, 49, 51, 52, 53, 54, 55, 56, 57, or 58.

60. The product produced by the method of claim 50.

61. A lubricating oil composition comprising a major amount of an oil of lubricating viscosity and a minor amount of an overbased polyalkenyl sulfonate composition wherein the polyalkenyl sulfonate is an alkali metal or alkaline earth metal salt of a polyalkenyl sulfonic acid derived from a mixture of polyalkenes comprising greater than 20 mole percent alkyl vinylidene and 1,1-dialkyl isomers.

62. The composition of claim 61 wherein the mixture of polyalkenes comprises greater than 50 mole percent alkyl vinylidene and 1,1-dialkyl isomers.

63. The composition of claim 61 wherein the mixture of polyalkenes comprises greater than 70 mole percent alkyl vinylidene and 1,1-dialkyl isomers.

64. The composition of claim 61, 62, or 63 wherein the alkyl vinylidene isomer is a methyl vinylidene isomer, and the 1,1-dialkyl isomer is a 1,1-dimethyl isomer.

65. The composition of claim 61 wherein the number average molecular weight of the polyalkene is about 168 to about 5000.

66. The composition of claim 61 wherein the number average molecular weight of the polyalkene is about 550.

67. The composition of claim 61 wherein the number average molecular weight of the polyalkene is about 1000.

68. The composition of claim 61 wherein the number average molecular weight of the polyalkene is about 2300.

69. The composition of claim 61 wherein the polyalkene is polyisobutene.

70. The composition of claim 69 wherein the polyisobutene is made using a $BF_3$ catalyst.

71. The composition of claim 61 wherein the polyalkene is polyisobutene and the molecular weight distribution of the polyisobutenyl sulfonic acids has at least 80% of the polyisobutenyl sulfonic acids molecular weights separated by even multiples of 56 daltons.

72. The composition of claim 61 wherein the polyalkene is polyisobutene and less than 20% of the polyisobutenyl sulfonic acids in the molecular weight distribution of the polyisobutenyl sulfonic acids contain a total number of carbon atoms that is not evenly divisible by four.

73. A composition comprising a major amount of an oil of lubricating viscosity and a minor amount of a polyalkenyl sulfonate composition having a TBN of greater than 60 to about 400 wherein the polyalkenyl sulfonate is an alkali metal or alkaline earth metal salt of a polyalkenyl sulfonic acid derived from a mixture of polyalkenes comprising greater than 20 mole percent alkyl vinylidene and 1,1-dialkyl isomers.

74. The composition of claim 73 wherein the mixture of polyalkenes comprises greater than 50 mole percent alkyl vinylidene and 1,1-dialkyl isomers.

75. The composition of claim 73 wherein the mixture of polyalkenes comprises greater than 70 mole percent alkyl vinylidene and 1,1-dialkyl isomers.

76. The composition of claim 71, 72 or 73 wherein the alkyl vinylidene isomer is a methyl vinylidene isomer, and the 1,1-dialkyl isomer is a 1,1-dimethyl isomer.

77. The composition of claim 73 wherein the number average molecular weight of the polyalkene is about 168 to about 5000.

78. The composition of claim 73 wherein the number average molecular weight of the polyalkene is about 550.

79. The composition of claim 73 wherein the number average molecular weight of the polyalkene is about 1000.

80. The composition of claim 73 wherein the number average molecular weight of the polyalkene is about 2300.

81. The composition of claim 73 wherein the polyalkene is polyisobutene.

82. The composition of claim 81 wherein the polyisobutene is made using a $BF_3$ catalyst.

83. The composition of claim 73 wherein the polyalkene is polyisobutene and the molecular weight distribution of the polyisobutenyl sulfonic acids has at least 80% of the polyisobutenyl sulfonic acids molecular weights separated by even multiples of 56 daltons.

84. The composition of claim 73 wherein the polyalkene is polyisobutene and less than 20% of the polyisobutenyl sulfonic acids in the molecular weight distribution of the polyisobutenyl sulfonic acids contain a total number of carbon atoms that is not evenly divisible by four.

85. The composition of claim 75 wherein the polyalkene is polyisobutene and the molecular weight distribution of the polyisobutenyl sulfonic acids has at least 80% of the polyisobutenyl sulfonic acids molecular weights separated by even multiples of 56 daltons.

86. The composition of claim 75 wherein the polyalkene is polyisobutene and less than 20% of the polyisobutenyl sulfonic acids in the molecular weight distribution of the polyisobutenyl sulfonic acids contain a total number of carbon atoms that is not evenly divisible by four.

* * * * *